United States Patent
Nishiguchi (10) Patent No.: US 12,299,978 B2
(45) Date of Patent: May 13, 2025

(54) TERMINAL APPARATUS FOR PERFORMING COMMUNICATION BETWEEN REMOTE LOCATIONS

(71) Applicant: toraru Co., Ltd., Kobe (JP)

(72) Inventor: Jun Nishiguchi, Kobe (JP)

(73) Assignee: toraru Co., Ltd. (JP)

( * ) Notice: Subject to any disclaimer, the term of this patent is extended or adjusted under 35 U.S.C. 154(b) by 0 days.

(21) Appl. No.: 18/585,529

(22) Filed: Feb. 23, 2024

(65) Prior Publication Data
US 2024/0193947 A1 Jun. 13, 2024

Related U.S. Application Data (62) Division of application No. 17/628,746, filed as application No. PCT/JP2021/046184 on Dec. 15, 2021, now Pat. No. 11,915,482.

(30) Foreign Application Priority Data

Jan. 29, 2021 (JP) .................................. 2021-013970

(51) Int. Cl.
*G06V 20/40* (2022.01)
*G06F 3/0481* (2022.01)
(Continued)

(52) U.S. Cl.
CPC ............ *G06V 20/41* (2022.01); *G06F 3/0481* (2013.01); *G06F 3/04842* (2013.01); *H04N 5/76* (2013.01)

(58) Field of Classification Search
CPC ...... G06V 20/41; G06V 20/40; G06F 3/0481; G06F 3/04842; H04N 5/76
See application file for complete search history.

(56) References Cited

U.S. PATENT DOCUMENTS 11,151,643 B1* 10/2021 Anerella ............ G06Q 30/0633
2010/0262517 A1* 10/2010 Woods ............... G06Q 30/0603
705/26.1
(Continued)

FOREIGN PATENT DOCUMENTS

CN          103765872 A      4/2014
JP          2001-346191 A   12/2001
(Continued)

OTHER PUBLICATIONS

Office Action issued in Japanese priority application 2021-013970 dated Feb. 12, 2021 (9 pages).
(Continued)

*Primary Examiner* — Olisa Anwah
(74) *Attorney, Agent, or Firm* — Harness, Dickey & Pierce, P.L.C.

(57) ABSTRACT

A system is provided that supports a remote proxy service in which, on behalf of a request source user, a request destination user goes to a location (local site) where the request source user cannot go, and performs what is instructed by the request source user. The system includes a first terminal apparatus used by the request source user and a second terminal apparatus used by the request destination user. The first terminal apparatus displays a moving image captured at a local site by the second terminal apparatus in real time. When the request source user selects an image included in the moving image displayed by the first terminal apparatus, the selected image is displayed on the second terminal apparatus. The request destination user can receive an instruction regarding the object appearing in the image while viewing the image selected by the request source user.

9 Claims, 4 Drawing Sheets

(51) Int. Cl.
*G06F 3/04842* (2022.01)
*H04N 5/76* (2006.01)

(56) References Cited

U.S. PATENT DOCUMENTS

| | | |
|---|---|---|
| 2013/0157697 A1 | 6/2013 | Kang et al. |
| 2014/0085400 A1* | 3/2014 | Kaus ................... H04N 7/18 348/14.03 |
| 2014/0160226 A1 | 6/2014 | Hirano |
| 2015/0070459 A1 | 3/2015 | Sawa |
| 2015/0381930 A1* | 12/2015 | Quinn ................ H04N 7/147 348/14.14 |
| 2017/0366656 A1 | 12/2017 | Agarwal et al. |
| 2018/0068357 A1* | 3/2018 | High ................ G06Q 30/0281 |
| 2018/0096526 A1 | 4/2018 | Valdivia et al. |
| 2021/0334889 A1* | 10/2021 | Isgar ................... H04N 7/185 |
| 2022/0383394 A1* | 12/2022 | Anerella ........... H04N 21/2187 |

FOREIGN PATENT DOCUMENTS

| | | |
|---|---|---|
| JP | 2005-167500 A | 6/2005 |
| JP | 2015-052895 A | 3/2015 |
| JP | 2020-198474 A | 12/2020 |
| WO | 2013-183214 A1 | 12/2013 |

OTHER PUBLICATIONS

International Search Report for corresponding International Application No. PCT/JP2021/046184 dated Feb. 15, 2022, with English translation (5 Pages).

Written Opinion for corresponding International Application No. PCT/JP2021/046184 dated Feb. 15, 2022, with English translation (12 Pages).

Chinese Office Action issued in Chinese application 202180004644.6 dated Jun. 20, 2024; (23 pages).

Office Action issued in the corresponding Indian Patent Application No. 202217003350; mailed on Jan. 1, 2024 (total 7 pages).

* cited by examiner

TERMINAL APPARATUS FOR PERFORMING COMMUNICATION BETWEEN REMOTE LOCATIONS

CROSS REFERENCE TO RELATED APPLICATIONS

This application is a divisional application of U.S. application Ser. No. 17/628,746, filed Jan. 20, 2022, which is a U.S. National Phase Application under 35 U.S.C. 371 of International Application No. PCT/JP2021/046184, filed on Dec. 15, 2021, which claims priority to Japanese Patent Application No. 2021-013970, filed on Jan. 29, 2021. The entire disclosures of the above applications are expressly incorporated by reference herein.

BACKGROUND

Technical Field

The present invention relates to a technique for supporting smooth communication between users at locations separated from each other.

Related Art

Accompanying the proliferation of communication networks such as the Internet and mobile communication networks and the improvement of communication speeds in those communication networks, moving image data representing a moving image (accompanying sound picked up by a microphone) captured by a camera is transmitted and received in substantially real time between terminal apparatuses used by users (in the present application, the term "user" is not limited to humans, and includes apparatuses capable of intellectual activity similar to that of a human being, such as an apparatus having artificial intelligence) at locations separated from each other, and by playing back those moving images on the terminal apparatuses, it is possible to perform a video call.

A service (hereinafter referred to as a "remote proxy service") has been proposed in which, using the above-described video call mechanism, a user who is a request source (hereinafter referred to as a "request source user") finds a person (hereinafter referred to as a "request destination user") to go on his or her behalf to a location (hereinafter referred to as a "local site") to which he or she cannot go himself or herself, and due to the request destination user who is at the local site and the request source user who is not at the local site achieving communication with each other, the request source user has a simulated experience of going to the local site and has the request destination user do what the request source user wants to do at the local site (e.g., purchase of goods, business negotiation, etc.) on the request source user's behalf.

JP 2020-198474A is an example of a patent document that proposes a mechanism for supporting the remote proxy service as described above.

In the remote proxy service, smooth communication may be difficult between the request source user and the request destination user. For example, the request source user may discover an object of interest in the moving image of the local site being captured, and the request source user may want the request destination user to check what the object is. In such a case, since the request source user does not know what the object of interest is, it is not easy to convey the object to the request destination user.

In view of the above-described circumstance, the present invention provides means for supporting smooth communication between users who are at locations separated from each other.

SUMMARY

The present invention provides, as a first aspect, a terminal apparatus including: a reception means for receiving moving image data transmitted in real time from a communication partner apparatus; a selected image acquisition means for acquiring image identification data for identifying a selected image among a plurality of images constituting a moving image represented by the moving image data received by the reception means; and a transmission means for transmitting the image identification data acquired by the selected image acquisition means, or image data representing the image identified by the image identification data to the communication partner apparatus.

With the terminal apparatus according to the first aspect, it is possible to notify the communication partner apparatus of the image selected by the user among the images constituting the moving image transmitted from the communication partner apparatus. As a result, the user can convey the object that he or she is interested in to the user who is the communication partner by an image.

In the terminal apparatus according to the first aspect, it is also possible to adopt, as a second aspect, a configuration further including: a display instruction means for displaying the moving image represented by the moving image data received by the reception means on a display apparatus; and an operation reception means for receiving a user operation on an image being displayed on the display apparatus, in which the selected image acquisition means acquires the image identification data for identifying the image that was being displayed by the display apparatus when the operation reception means received the user operation on the moving image displayed by the display apparatus as image identification data of a selected image or image identification data of a selected candidate image.

With the terminal apparatus according to the second aspect, if an image of interest is displayed while playing back a moving image transmitted from the communication partner apparatus in substantially real time, the user can select the image as an image to send to the communication partner apparatus or a candidate image to send to the communication partner apparatus by performing a predetermined operation.

In the terminal apparatus according to the first aspect, it is also possible to adopt, as a third aspect, a configuration further including: a storage means for storing at least a portion of the moving image data received by the reception means, the portion corresponding to a most recent past predetermined amount; an operation reception means for receiving a user operation on an image being displayed on the display apparatus; and a display instruction means for displaying the moving image represented by the moving image data received by the reception means on the display apparatus in real time, and displaying, on the display apparatus, an image designated by an operation performed using the operation reception means among images constituting a past moving image represented by the moving image data stored in the storage means, in which, if the operation reception means has received the user operation for selecting the image designated by an operation performed using the operation reception means, the image being displayed by the display apparatus, the selected image acquisition means acquires the image identification data of the selected image as image identification data of a selected image or image identification data of a selected candidate image.

With the terminal apparatus according to the third aspect, even if there was an image of interest in a moving image that was transmitted from the communication partner apparatus and was played back in approximately real time, but the operation for selecting the image was not performed at the timing at which the image was displayed, the user can select the image later as an image to send to the communication partner apparatus or as a candidate for an image to send to the communication partner apparatus.

In the terminal apparatus according to the second or third aspect, it is also possible to adopt, as a fourth aspect, a configuration in which, if the image identification data of a selected candidate image has been acquired by the selected image acquisition means, the display instruction means displays the image identified by the image identification data on the display apparatus as a selected candidate image, and if the operation reception means has received the user operation for selecting any one of one or more selected candidate images being displayed by the display apparatus, the selected image acquisition means acquires the image identification data of the selected image as selected image identification data.

With the terminal apparatus according to the fourth aspect, the user can select a candidate for an image to send to the communication partner apparatus, and thereafter select an image to actually send to the communication partner apparatus from among one or more selected candidates.

In the terminal apparatus according to any one of the second to fourth aspects, it is also possible to adopt, as a fifth aspect, a configuration in which the operation reception means receives the user operation for designating any region included in the selected image identified by the image identification data acquired by the selected image acquisition means, and the transmission means transmits region data indicating the region designated by the user to the communication partner apparatus.

With the terminal apparatus according to the fifth aspect, the user can notify the user of the communication partner apparatus of the region of interest in the image transmitted to the communication partner apparatus.

In any one of the second to fifth terminal apparatuses, it is also possible to adopt, as a sixth aspect, a configuration further including an image recognition means for recognizing an object appearing in the selected image identified by the image identification data acquired by the selected image acquisition means, in which the display instruction means displays, on the display apparatus, an image obtained by adding a display object indicating a result of recognition performed by the image recognition means to the selected image identified by the image identification data acquired by the selected image acquisition means.

With the terminal apparatus according to the sixth aspect, the user can easily find out what appears in the image to send to the communication partner apparatus or the candidate image to send to the communication partner apparatus.

In any one of the second to sixth terminal apparatuses, it is also possible to adopt, as a seventh aspect, a configuration in which the display instruction means displays a virtual operation button on the display apparatus, and if the operation reception means has received the user operation on the operation button, the transmission means transmits message identification data for identifying a message corresponding to the operation button or message data indicating the message, to the communication partner apparatus.

With the terminal apparatus according to the seventh aspect, the user can accurately convey the message that he or she wants to convey to the user of the communication partner apparatus by performing an operation on the operation button corresponding to the message.

In the terminal apparatus according to the seventh aspect, it is also possible to adopt, as an eighth aspect, a configuration in which, if the operation reception means has received an operation of associating the image selected by the user with the operation button, the transmission means transmits the message identification data for identifying the message corresponding to the operation button or the message data indicating the message, in association with the image identification data acquired by the selected image acquisition means or the image data representing the image identified by the image identification data, to the communication partner apparatus.

With the terminal apparatus according to the eighth aspect, it is possible to convey a message related to the image together with the image to the user of the communication partner apparatus.

In the terminal apparatus according to the seventh or eighth aspect, it is also possible to adopt, as a ninth aspect, a configuration in which the message data is text data indicating a sentence written in a language used by a user of the communication partner apparatus or voice data representing a sound of uttering the sentence.

With the terminal apparatus according to the ninth aspect, even if the language used by the user is different from the language used by the user of the communication partner apparatus, it is possible to convey a message that the partner user can understand.

In the terminal apparatus according to any one of the seventh to ninth aspects, it is also possible to adopt, as a tenth aspect, a configuration in which the message data is data indicating a state of the user.

With the terminal apparatus according to the tenth aspect, the user can convey his or her state to the user of the communication partner apparatus.

In the terminal apparatus according to the seventh or eighth aspect, it is also possible to adopt, as an eleventh aspect, a configuration in which the message data is operation instruction data for instructing a physical operation to the communication partner apparatus.

With the terminal apparatus according to the eleventh aspect, the user can remotely control the physical operation of the communication partner apparatus.

The present invention also provides, as a twelfth aspect, a terminal apparatus including: a moving image acquisition means for acquiring moving image data representing a moving image captured by an image capture apparatus; a transmission means for transmitting the moving image data acquired by the moving image acquisition means to a communication partner apparatus in real time; a storage means for storing at least a portion of the moving image data acquired by the moving image acquisition means, the portion corresponding to a most recent past predetermined amount; a reception means for receiving image identification data for identifying an image transmitted from the communication partner apparatus; and a display instruction means for displaying, on a display apparatus, the image identified by the image identification data received by the reception means among a plurality of images constituting the moving image represented by the moving image data stored in the storage means.

With the terminal apparatus according to the twelfth aspect, the user can see and check the image selected by the user of the communication partner apparatus among the plurality of images constituting the moving image transmitted to the communication partner apparatus.

In the terminal apparatus according to the twelfth aspect, it is also possible to adopt, as a thirteenth aspect, a configuration in which, if the reception means has received message identification data for identifying a message transmitted in association with the image identification data or message data indicating the message from the communication partner apparatus, the display instruction means displays, on the display apparatus, the message identified by the message identification data or the message indicated by the message data, together with the image identified by the image identification data.

With the terminal apparatus according to the thirteenth aspect, the user can find out the message of the user of the communication partner apparatus regarding the image selected by the user of the communication partner apparatus.

In the terminal apparatus according to the thirteenth aspect, it is also possible to adopt, as a fourteenth aspect, a configuration further including a translation means for, if text data indicating a sentence in a language that is not a language used by a user of the terminal apparatus, acquiring text data indicating a sentence obtained by translating the sentence indicated by the text data into the language used by the user, in which, if the message indicated by the message data indicates a sentence in a language that is not the language used by the user of the terminal apparatus, the display instruction means displays, on the display apparatus, a sentence obtained by translating the sentence indicated by the text data acquired by the translation means.

With the terminal apparatus according to the fourteenth aspect, the user can read and understand a message from the user of the communication partner apparatus even if the user uses a language different from that of the user of the communication partner apparatus.

In the terminal apparatus according to the thirteenth or fourteenth aspect, it is also possible to adopt, as a fifteenth aspect, a configuration further including: an interpretation means for, if text data indicating a sentence in a language that is not a language used by a user of the terminal apparatus has been acquired, acquiring voice data representing a sound of uttering a sentence obtained by translating the sentence indicated by the text data into the language used by the user; and a sound generation instruction means for, if the message indicated by the message data indicates a sentence in a language that is not the language used by the user of the terminal apparatus, causing a sound generation apparatus to generate the sound of uttering the sentence obtained by translating the sentence represented by the voice data acquired by the interpretation means.

With the terminal apparatus according to the fifteenth aspect, the user can hear and understand the message from the user of the communication partner apparatus even if the user uses a language different from that of the user of the communication partner apparatus.

In the terminal apparatus according to any one of the twelfth or fifteenth aspects, it is also possible to adopt, as a sixteenth aspect, a configuration further comprising: a position acquisition means for acquiring position data indicating a position of the terminal apparatus; and a map acquisition means for acquiring map data representing a map of an area including the position of the terminal apparatus, in which the display instruction means displays, on the display apparatus, an image obtained by adding, to a map represented by the map data, a display object indicating the position indicated by the position data corresponding to an image capture timing of the image identified by the image identification data received by the reception means.

With the terminal apparatus according to the sixteenth aspect, the user can know the location where the image selected by the user of the communication partner apparatus was captured.

In the terminal apparatus according to the sixteenth aspect, it is also possible to adopt, as a seventeenth aspect, a configuration in which the moving image acquisition means acquires, together with moving image data, image capture direction data indicating respective image capture directions of a plurality of images constituting the moving image represented by the moving image data, and the display instruction means displays, on the display apparatus, an image obtained by adding, to the map represented by the map data, a display object indicating the image capture direction indicated by the image capture direction data corresponding to the image capture timing of the image identified by the image identification data received by the reception means.

With the terminal apparatus according to the seventeenth aspect, the user can know the image capture direction of the image selected by the user of the communication partner apparatus.

In the terminal apparatus according to any one of the twelfth to seventeenth aspects, it is also possible to adopt, as an eighteenth aspect, a configuration further including: a position acquisition means for acquiring position data indicating a position of the terminal apparatus; and a movement route acquisition means for acquiring movement route data indicating a movement route from the position of the terminal apparatus indicated by the position data acquired most recently by the position acquisition means, to a position indicated by the position data corresponding to an image capture timing of the image identified by the image identification data received by the reception means, in which the display instruction means displays, on the display apparatus, a display object indicating the movement route indicated by the movement route data.

With the terminal apparatus according to the eighteenth aspect, the user can know the movement route for moving from the current position to the location where the image selected by the user of the communication partner apparatus was captured.

In the terminal apparatus according to the twelfth aspect, it is also possible to adopt, as a nineteenth aspect, a configuration further including an operation means for, if the reception means has received message identification data for identifying an operation instruction instructing a physical operation, the operation instruction being transmitted in association with the image identification data, or message data indicating the operation instruction from the communication partner apparatus, performing a physical operation according to the operation instruction identified by the message identification data or the operation instruction indicated by the message data.

With the terminal apparatus according to the nineteenth aspect, the user of the communication partner apparatus can remotely control the terminal apparatus to cause the terminal apparatus to perform an operation that the user wants to perform at the local site.

In the terminal apparatus according to the twelfth aspect, it is also possible to adopt, as a twentieth aspect, a configuration further including: a position acquisition means for acquiring position data indicating a position of the terminal apparatus; a movement route acquisition means for acquiring movement route data indicating a movement route from the position of the terminal apparatus indicated by the position data acquired most recently by the position acquisition means, to a position indicated by the position data corresponding to an image capture timing of the image identified by the image identification data received by the reception means; and a movement means for moving according to the movement route indicated by the movement route data.

With the terminal apparatus according to the twentieth aspect, the user of the communication partner apparatus can move the terminal apparatus to the location where the image was captured by sending the image selected by the user to the communication partner apparatus.

The present invention also provides, as a twenty-first aspect, a program for causing a computer to execute: processing for receiving moving image data transmitted in real time from a communication partner apparatus; processing for acquiring image identification data for identifying a selected image among a plurality of images constituting the moving image represented by the received moving image data; and processing for transmitting the acquired image identification data or image data representing the image identified by the image identification data to the communication partner apparatus.

With the program according to the twenty-first aspect, the terminal apparatus according to the first aspect is realized by a computer.

The present invention also provides, as a twenty-second aspect, a program for causing a computer to execute: processing for acquiring moving image data representing a moving image captured by an image capture apparatus; processing for transmitting the acquired moving image data to a communication partner apparatus in real time; processing for storing at least a portion of the acquired moving image data, the portion corresponding to a most recent past predetermined amount; processing for receiving image identification data for identifying an image transmitted from the communication partner apparatus; and processing for displaying, on a display apparatus, the image identified by the received image identification data among a plurality of images constituting the moving image represented by the stored moving image data.

With the program according to the twenty-second aspect, the terminal apparatus according to the twelfth aspect is realized by a computer.

DETAILED DESCRIPTION

Embodiment

Figure 1:
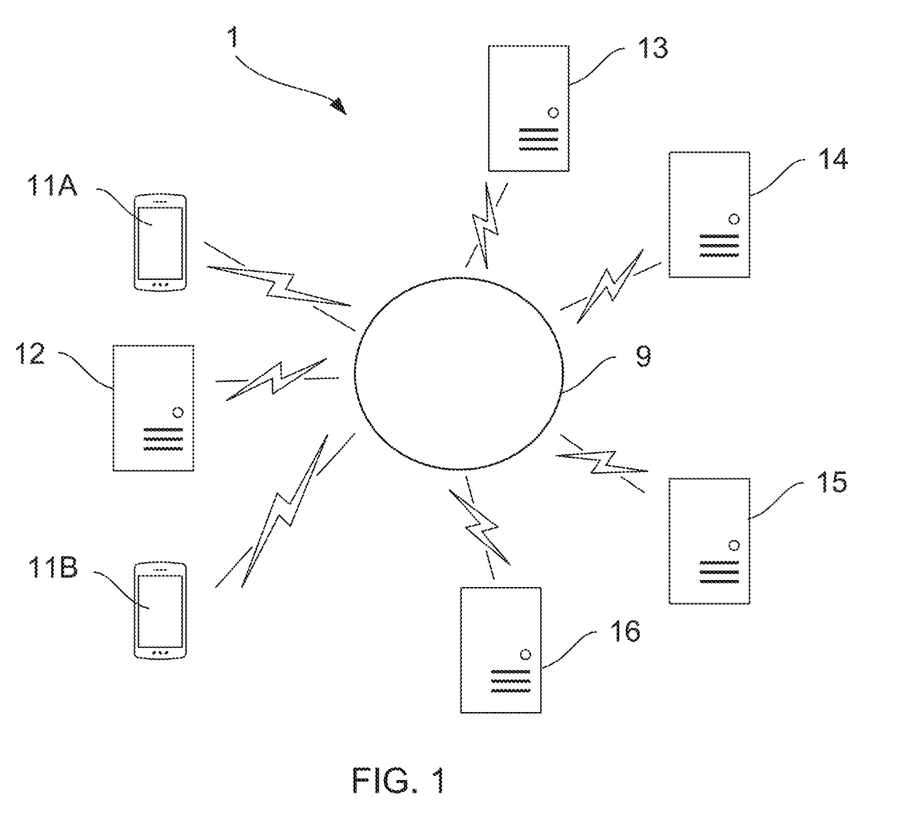
FIG. 1 is a diagram showing an overall configuration of a system according to an embodiment.

System 1 according to an embodiment of the present invention will be described hereinafter. System 1 is a system that serves as a platform for a remote proxy service. FIG. 1 is a diagram showing an overall configuration of system 1. System 1 includes terminal apparatus 11A, terminal apparatus 11B, management server apparatus 12, route search server apparatus 13, translation server apparatus 14, voice synthesis server apparatus 15, and voice recognition server apparatus 16. These apparatuses constituting system 1 can communicate with each other via network 9.

Terminal apparatus 11A is a terminal apparatus used by a request source user of the remote proxy service. Terminal apparatus 11B is a terminal apparatus used by a request destination user of the remote proxy service. In FIG. 1, only one terminal apparatus 11A and one terminal apparatus 11B are shown, but in reality, the number of these terminal apparatuses varies depending on the number of users who use system 1.

Management server apparatus 12 is a server apparatus that manages the users of system 1, supports matching between the request source user and the request destination user, establishes a communication connection between terminal apparatus 11A of the request source user and terminal apparatus 11B of the request destination user, and the like.

Route search server apparatus 13 is a server apparatus that, upon receiving a request including position data indicating positions of a departure location and a destination from any apparatus, specifies a movement route from the departure location to the destination in response to the request, and transmits movement route data indicating the specified movement route and map data representing a map of an area including the specified movement route to the request source apparatus.

Translation server apparatus 14 is a server apparatus that, upon receiving a request including text data indicating a sentence and language designation data indicating a language into which the sentence is to be translated from any apparatus, translates the text indicated by the text data into the language indicated by the language designation data in response to the request, and transmits text data indicating the translated sentence to the request source apparatus.

Voice synthesis server apparatus 15 is a server apparatus that, upon receiving a request including text data indicating a sentence from any apparatus, synthesizes a voice uttering the sentence indicated by the text data in response to the request, and transmits voice data representing the synthesized voice to the request source apparatus.

Voice recognition server apparatus 16 is a server apparatus that, upon receiving a request including voice data representing a voice from any apparatus, recognizes the voice represented by the voice data in response to the request, and transmits text data indicating the recognized sentence to the request source apparatus.

Each of management server apparatus 12, route search server apparatus 13, translation server apparatus 14, voice synthesis server apparatus 15, and voice recognition server apparatus 16 is realized by one computer or a plurality of computers operating in cooperation with each other. The computer for realizing these server apparatuses is, for example, a computer for a general server apparatus including a processor, a memory, and a communication interface.

Terminal apparatus 11A is realized due to a computer for a terminal apparatus such as a desktop PC (Personal Computer), a notebook PC, a tablet PC, or a smart phone executing processing according to a program for the terminal apparatus of the request source user according to the present embodiment. Since terminal apparatus 11A is used by the request source user, the computer for realizing terminal apparatus 11A does not necessarily need to be portable. The computer for realizing terminal apparatus 11A includes or is connected to a microphone (an example of a sound pickup apparatus) that picks up the voice of the request source user, a keyboard (an example of an operation apparatus) that receives an operation performed by the request source user, a display (an example of a display apparatus) that displays various types of information to the request source user, a speaker or the like (an example of a sound generation apparatus) that generates sound for the request source user, a camera (an example of an image capture apparatus) that captures the appearance and the like of the request source user, and a GNSS (Global Navigation Satellite System) unit (an example of a position measurement apparatus) that measures the position (e.g., latitude and longitude) of the computer on the Earth, and data can be transferred between the computer and these apparatuses.

Terminal apparatus 11B is realized by a computer for a terminal apparatus such as a tablet PC or a smartphone executing processing according to a program for the terminal apparatus of the request destination user according to the present embodiment. Since terminal apparatus 11B is used by a request destination user who needs to move at a local site, the computer for realizing terminal apparatus 11B needs to be portable. The computer for realizing terminal apparatus 11B includes or is connected to a microphone (an example of a sound pickup apparatus) that picks up the voice of the request destination user, a touch panel or the like (an example of an operation apparatus) that receives the operation of the request destination user, a display (an example of a display apparatus) that displays various types of information to the request destination user, a speaker or the like (an example of a sound generation apparatus) that generates sound for the request destination user, a camera (an example of an image capture apparatus) that captures an image of the surrounding area and the like of the request destination user, a GNSS (Global Navigation Satellite System) unit (an example of a position measurement apparatus) that measures the position (e.g., latitude and longitude) of the computer on the Earth, and an azimuth sensor (an example of an azimuth measurement apparatus) that measures the azimuth of the image capture direction of the camera of terminal apparatus 11B, and data can be transferred between the computer and these apparatuses.

As described above, the computer for realizing terminal apparatus 11A and the computer for realizing terminal apparatus 11B have different required specifications, but in the following description, for the sake of convenience, it is assumed that the computer for realizing terminal apparatus 11A and the computer for realizing terminal apparatus 11B have the same specifications.

Figure 2:
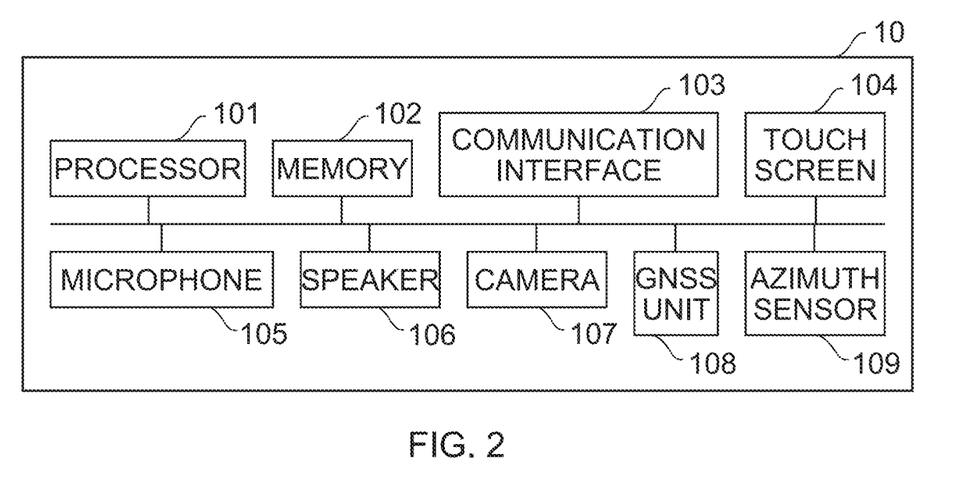
FIG. 2 is a diagram showing a configuration of a computer for realizing a terminal apparatus according to an embodiment.

FIG. 2 is a diagram showing a configuration of computer 10 for realizing terminal apparatus 11A or terminal apparatus 11B. Computer 10 includes processor 101 that performs various types of data processing according to a program, memory 102 that stores various types of data including the program, communication interface 103 that performs data communication with another apparatus, touch screen 104 that serves as a user interface, microphone 105 that picks up sound in the surrounding area, speaker 106 that generates sound, camera 107 that performs image capture, GNSS unit 108 that measures the position of computer 10, and azimuth sensor 109 that measures the azimuth of the image capture direction of camera 107.

Note that touch screen 104 is, for example, a device in which a liquid crystal display and a touch panel are laminated, and performs displays of an image or the like to the user and accepts a touch operation performed by the user on computer 10.

The functions of terminal apparatus 11A and the functions of terminal apparatus 11B are partially different, but many of these functions are held in common. Accordingly, in the following description, for convenience, the functional configuration included in terminal apparatus 11A and the functional configuration included in terminal apparatus 11B are assumed to be the same as each other. For example, terminal apparatus 11A need not include azimuth measurement apparatus 1105 described below. Also, for example, reception means 111 included in terminal apparatus 11A and reception means 111 included in terminal apparatus 11B receive different data. These differences will be clarified through description of the operation of terminal apparatus 11A and terminal apparatus 11B, which will be described later with reference to FIGS. 4 and 5.

Figure 3:
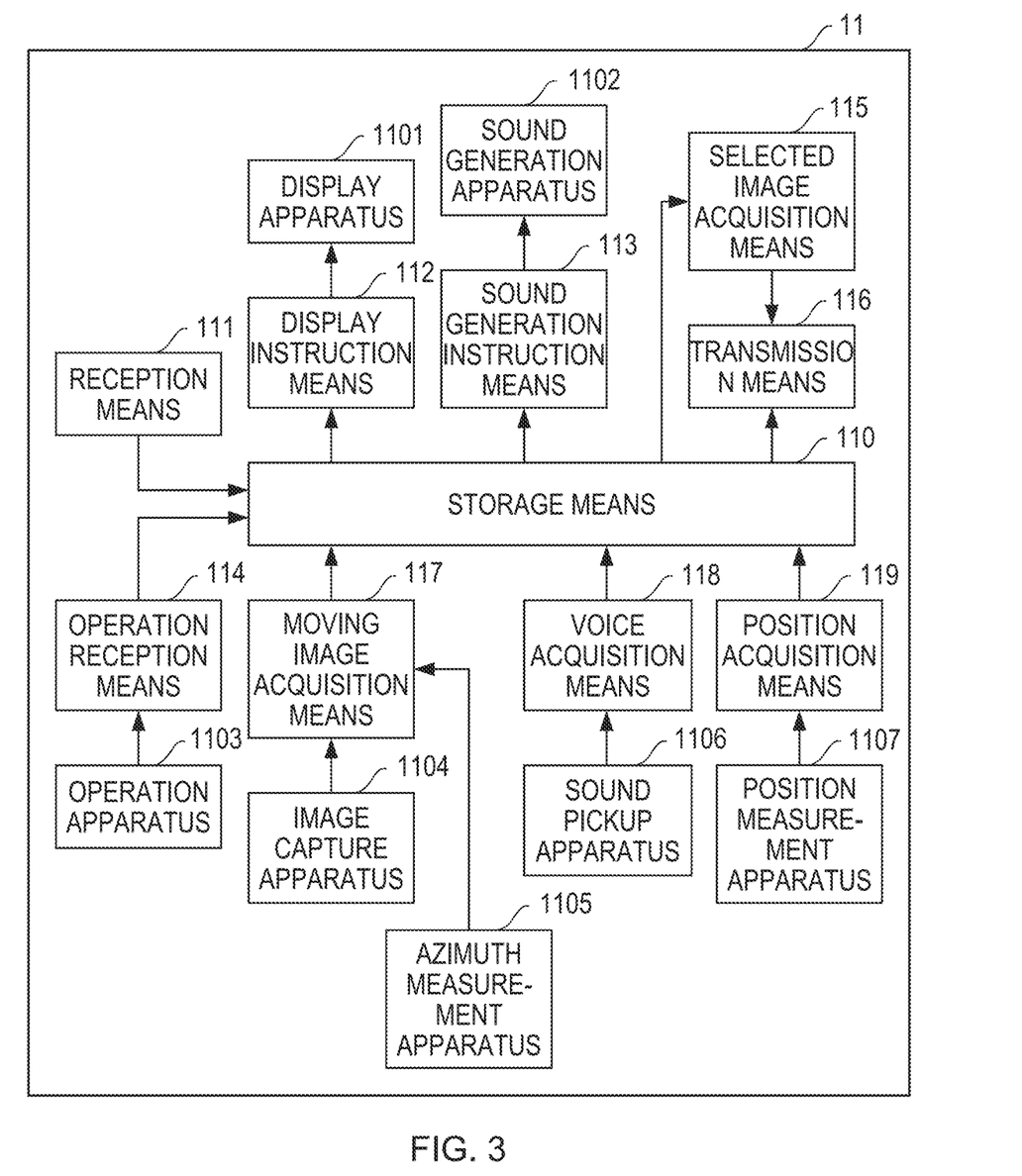
FIG. 3 is a diagram showing a functional configuration of a terminal apparatus according to an embodiment.

FIG. 3 is a diagram showing a functional configuration of terminal apparatus 11A or terminal apparatus 11B. Storage means 110 is realized by memory 102 and stores various types of data. Reception means 111 is realized by communication interface 103 and receives various types of data from other apparatuses.

Display apparatus 1101 is realized by touch screen 104 and displays an image. Display instruction means 112 is realized by processor 101 and causes display apparatus 1101 to display an image. Sound generation apparatus 1102 is realized by speaker 106 and generates sound. Sound generation instruction means 113 is realized by processor 101 and causes sound generation apparatus 1102 to generate sound.

Operation apparatus 1103 is realized by touch screen 104 and physically accepts an operation performed by the user. Operation reception means 114 is realized by processor 101 and receives the user's operation through software by specifying the content of the physical operation received by operation apparatus 1103. Selected image acquisition means 115 is realized by processor 101 and acquires image identification data for identifying an image to be selected from among a plurality of images (still images) constituting a moving image represented by moving image data received by reception means 111 from another apparatus.

Transmission means 116 is realized by communication interface 103, and transmits various types of data to another apparatus.

Image capture apparatus 1104 is realized by camera 107, performs image capture, and generates moving image data representing a moving image. Moving image acquisition means 117 acquires the moving image data generated by image capture apparatus 1104. Azimuth measurement apparatus 1105 is realized by azimuth sensor 109, measures the image capture direction of image capture apparatus 1104, and generates image capture direction data indicating the measurement result. Moving image acquisition means 117 acquires the image capture direction data generated by azimuth measurement apparatus 1105 and associates it with the moving image data acquired from image capture apparatus 1104.

Sound pickup apparatus 1106 is realized by microphone 105, picks up sound in the surrounding area, and mainly generates voice data representing the user's voice. Voice acquisition means 118 acquires the voice data generated by sound pickup apparatus 1106. Note that the moving image data acquired by moving image acquisition means 117 (moving image data associated with the image capture direction data) and the voice data acquired by voice acquisition means 118 are synthesized into synchronized moving image data with audio (hereinafter referred to simply as "moving image data").

Position measurement apparatus 1107 is realized by GNSS unit 108, measures the position of the terminal apparatus, and generates position data indicating the measurement result. Position acquisition means 119 is realized by processor 101 and acquires the position data generated by position measurement apparatus 1107.

In the present embodiment, as an example, it is assumed that the request source user uses Japanese and the request destination user uses English.

In this case, transmission means 116 of terminal apparatus 11B transmits a request including text data indicating a Japanese sentence received from terminal apparatus 11A to translation server apparatus 14, and reception means 111 of terminal apparatus 11B receives text data indicating an English sentence transmitted from translation server apparatus 14 as a response. That is, transmission means 116 and reception means 111 of terminal apparatus 11B serve as a translation means for, when text data indicating a sentence in a language that is not the language used by the user of terminal apparatus 11B is acquired, acquiring text data indicating the sentence obtained by translating the sentence indicated by the text data into the language used by the user.

Also, transmission means 116 of terminal apparatus 11B transmits, to voice synthesis server apparatus 15, a request including text data indicating an English sentence received by reception means 111 of terminal apparatus 11B from translation server apparatus 14, and reception means 111 of terminal apparatus 11B receives voice data representing a voice uttering an English sentence transmitted from voice synthesis server apparatus 15 as a response. That is, transmission means 116 and reception means 111 of terminal apparatus 11B serve as an interpretation means for, when text data indicating a sentence in a language that is not the language used by the user of terminal apparatus 11B is acquired, acquiring voice data representing the sound of uttering the sentence obtained by translating the sentence indicated by the text data into the language used by the user.

Also, transmission means 116 of terminal apparatus 11B uses the most recent position data out of the position data acquired by position acquisition means 119 as the position data of the departure location, and transmits a request including position data corresponding to the image capture timing of the image identified by the image identification data received by reception means 111 of terminal apparatus 11B from terminal apparatus 11A as position data of the destination to route search server apparatus 13, and reception means 111 of terminal apparatus 11B receives movement route data and map data transmitted from route search server apparatus 13 as a response.

That is, transmission means 116 and reception means 111 of terminal apparatus 11B serve as a map acquisition means for acquiring map data representing a map of the area including the position of terminal apparatus 11B. Also, transmission means 116 and reception means 111 of terminal apparatus 11B serve as a movement route acquisition means for acquiring movement route data indicating a movement route from the position of terminal apparatus 11B indicated by the position data last acquired by position acquisition means 119 of terminal apparatus 11B to a position indicated by the position data corresponding to the image capture timing of the image identified by the image identification data received by reception means 111 of terminal apparatus 11B.

Next, the operation of terminal apparatus 11A and terminal apparatus 11B will be described. In the following description, it is assumed that terminal apparatus 11A and terminal apparatus 11B have established a communication connection according to, for example, an instruction from management server apparatus 12.

Figure 4:
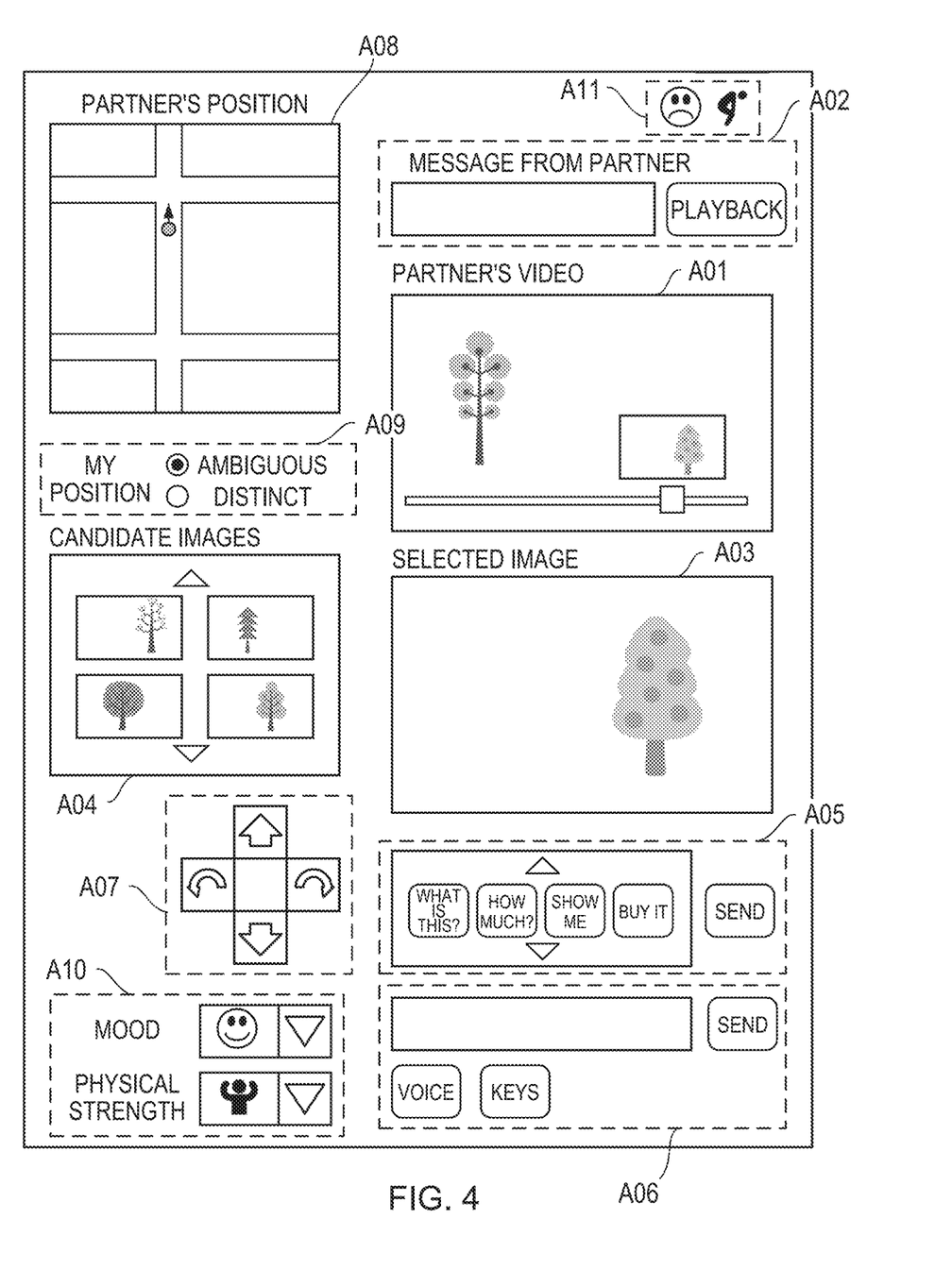
FIG. 4 is a diagram showing a screen displayed by a terminal apparatus used by a request source user according to an embodiment.

FIG. 4 is a diagram illustrating a screen (hereinafter referred to as "request source screen") displayed by terminal apparatus 11A. In region A01 of the request source screen, the moving image represented by the moving image data transmitted from terminal apparatus 11B to terminal apparatus 11A is displayed substantially in real time.

In the text box in region A02 of the request source screen, a Japanese sentence indicated by the text data received from translation server apparatus 14 is displayed as a response to terminal apparatus 11A transmitting, to translation server apparatus 14, a request including the message data received from terminal apparatus 11B.

When a sentence is displayed in the text box in region A02, a voice uttering the sentence is generated from sound generation apparatus 1102 of terminal apparatus 11A. The voice generated by sound generation apparatus 1102 is the voice represented by the voice data received from voice synthesis server apparatus 15 as a response obtained due to terminal apparatus 11A transmitting, to voice synthesis server apparatus 15, a request including text data indicating the sentence displayed in the text box of region A02. The request source user can make sound generation apparatus 1102 repeatedly generate sound by performing a touch operation on a "Playback" button in region A02.

In region A03 of the request source screen, an image selected by the request source user from a plurality of images constituting the moving image displayed in region A01 is displayed. By performing a touch operation on region A01, the request source user can select an image displayed in region A01 when the touch operation is performed. The image selected in this manner is displayed in region A03.

Also, by dragging knob P02 on time bar P01 displayed on the moving image in the left-right direction in region A01, the request source user can display, near knob P02, thumbnail P03 of an image of the timing corresponding to the position in the left-right direction of knob P02 among the images constituting the moving image displayed in region A01 in the most recent past predetermined time. For this reason, storage means 110 of terminal apparatus 11A stores the portion of the moving image data that corresponds to the most recent past predetermined time, the moving image data having been received from terminal apparatus 11B by reception means 111. By performing a touch operation on thumbnail P03, the request source user can select the image corresponding to thumbnail P03 being displayed when the touch operation is performed. The image selected in this manner is displayed in region A03.

In region A04 of the request source screen, thumbnails of the images dragged and dropped from region A03 to region A04 by the request source user among the images selected by the request source user and displayed in region A03 are displayed. The images for which thumbnails are displayed in region A04 are images selected as candidate images to be selected by the request source user. By dragging and dropping any one or more thumbnails displayed in region A04 from region A04 to region A03, the request source user can display the images corresponding to the thumbnails in region A03.

A plurality of virtual operation buttons are displayed in region A05 of the request source screen. Of those operation buttons, the four operation buttons on the left side are operation buttons for the request source user to convey a fixed message to the request destination user. In order starting from the left, the four operation buttons shown in FIG. 4 are associated with the messages "What is that?", "How much does it cost?", "Please show me it more clearly", and "Please buy it".

The request source user can register a plurality of sets of these operation buttons in terminal apparatus 11A in advance, and can switch the set of these operation buttons by performing a touch operation on the up-arrow button or the down arrow button displayed in region A05. The management server apparatus 12 stores various sets of operation buttons, and the request source user can download a set including operation buttons that are used frequently in the remote proxy service to terminal apparatus 11A from among those sets. Also, the request source user can create a new set of operation buttons or change the messages associated with the operation buttons included in the set downloaded from management server apparatus 12 to terminal apparatus 11A.

When the request source user performs a touch operation on any of the four operation buttons on the left side displayed in region A05, terminal apparatus 11A transmits message data indicating the message associated with the operation button on which the touch operation was performed to the terminal apparatus 11B.

When the request source user drags and drops the image displayed in region A03 to any of the four operation buttons on the left side displayed in region A05, terminal apparatus 11A transmits, to terminal apparatus 11B, image identification data identifying the dragged and dropped image, region data indicating a region (e.g., a region with a predetermined size and shape centered about the touched position) in the image that the request source user was touching when dragging and dropping the image, and message data indicating the message associated with the operation button at the drag-and-drop location, in association with each other. Note that, as the image identification data, for example, data indicating the frame number of the image constituting the moving image represented by the moving image data can be used, but there is no limitation to this.

When the request source user touches a "transmit" button displayed in the rightmost portion of region A05, terminal apparatus 11A transmits image identification data identifying the image that was displayed in region A03 when the touch operation was performed to terminal apparatus 11B. Also, when the request source user drags and drops the image displayed in region A03 to the "transmit" button in region A05, terminal apparatus 11A transmits the image identification data identifying the dragged and dropped image and region data indicating the region in the image touched by the request source user when dragging and dropping the image in associated with each other to terminal apparatus 11B.

In region A06 of the request source screen, text box P04 and the like for inputting a custom message that the request source user wants to send to the request destination user is displayed. By uttering a message to terminal apparatus 11A after touching a "Voice" button in region A06, the request source user can input text indicating the uttered message in text box P04. At that time, terminal apparatus 11A transmits a request including the voice data acquired by voice acquisition means 118 to voice recognition server apparatus 16, and as a response, displays the content of the text data transmitted from voice recognition server apparatus 16 in text box P04.

Also, when the request source user performs a touch operation on a "Key" button in region A06, terminal apparatus 11A displays a virtual keyboard. The request source user can input a message in text box P04 by performing a touch operation on the displayed virtual keyboard.

When the request source user inputs a message in text box P04 and then performs a touch operation on the "Send" button in region A06, terminal apparatus 11A transmits message data indicating the message input in text box P04 to terminal apparatus 11B. Also, when the request source user drags and drops the image displayed in region A03 to the "Send" button in region A06 or text box P04, terminal apparatus 11A transmits the image identification data identifying the dragged and dropped image, the region data indicating the region in the image touched by the request source user when dragging and dropping the image, and the message data indicating the message input in text box P04 in association with each other to terminal apparatus 11B.

In region A07 of the request source screen, a virtual operation button for the request source user to instruct the direction of movement and the like to the request destination user is displayed. The up-arrow button in region A07 is associated with message data indicating the message "Please move forward", and the down arrow button is associated with message data indicating the message "Please move backward". Also, the right rotation arrow in region A07 is associated with message data indicating the message "Please rotate to the right", and the left rotation arrow is associated with message data indicating the message "Please rotate to the left". When the request source user performs a touch operation on any of these operation buttons, terminal apparatus 11A transmits message data associated with the operation button on which the touch operation was performed to terminal apparatus 11B.

In region A08 of the request source screen, a map showing the current position of the request destination user (terminal apparatus 11B) is displayed. For this reason, terminal apparatus 11A receives the position data indicating the current position of terminal apparatus 11B, which is transmitted from terminal apparatus 11B at predetermined time intervals. Terminal apparatus 11A transmits a request including the position data received from terminal apparatus 11B to route search server apparatus 13, and displays the map in region A08 using the map data transmitted from route search server apparatus 13 as a response. Terminal apparatus 11A adds a circle mark indicating the current position of the request destination user indicated by the most recent position data transmitted from terminal apparatus 11B on the map, specifies a movement direction of the request destination user based on the change over time in the position of the request destination user indicated by the position data transmitted from terminal apparatus 11B, adds an arrow indicating the specified movement direction on the map, and displays the result in region A08.

In region A09 of the request source screen, a radio button for the request source user to select whether to convey his or her current position to the request destination user "ambiguously" or "distinctly" is displayed. When the request source user selects "ambiguous" in region A09, terminal apparatus 11A transmits position data that ambiguously indicates the current position of terminal apparatus 11A to the terminal apparatus 11B at predetermined time intervals. On the other hand, when the request source user selects "distinct" in region A09, terminal apparatus 11A transmits position data distinctly indicating the current position of terminal apparatus 11A to terminal apparatus 11B at predetermined time intervals. Here, the position data that ambiguously indicates the current position is, for example, data that indicates the current position with an accuracy on the order of several hundred meters. By contrast, the position data that distinctly indicates the current position is, for example, data that indicates the current position with an accuracy on the order of several meters.

In region A10 of the request source screen, a list box for conveying the current state of the request source user to the request destination user is displayed. In the list box on the upper side of region A10, a plurality of icons indicating moods such as "happy", "sad", and "angry" are listed as options. In the list box on the lower side of region A10, a plurality of icons indicating states of physical strength, such as "I have a lot of physical strength left", "I have some physical strength left", "I don't have much physical strength left", and "I have no more physical strength" are listed as options. When the request source user changes the icon indicating his or her current state in these list boxes, terminal apparatus 11A sends icon identification data identifying the changed icon to terminal apparatus 11B.

In region A11 of the request source screen, an icon indicating the current state of the request destination user is displayed. Similarly to the request source user, the request destination user can change the icons indicating his or her current state in a list box displayed on the screen of terminal apparatus 11B. When those icons are changed, the icon identification data identifying the changed icon is transmitted from terminal apparatus 11B to terminal apparatus 11A. Terminal apparatus 11A displays the icon identified by the icon identification data transmitted from terminal apparatus 11B in this manner in region A11.

Figure 5:
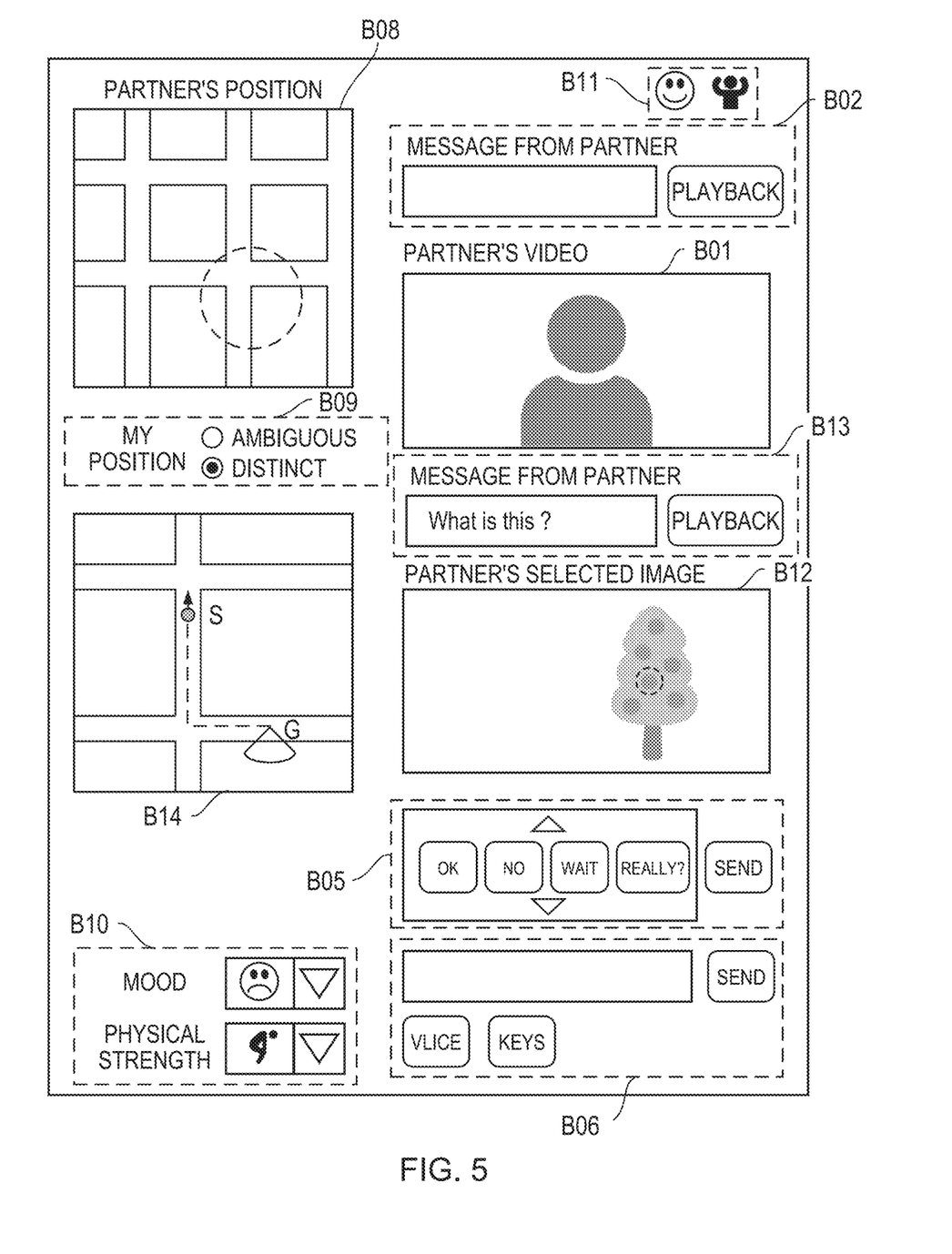
FIG. 5 is a diagram showing a screen displayed by a terminal apparatus used by a request destination user according to an embodiment.

FIG. 5 is a diagram illustrating a screen displayed by terminal apparatus 11B (hereinafter referred to as a "request destination screen"). The request destination screen includes regions for displaying display objects that are the same as or similar to those of the above-described request source screen (FIG. 4). In FIG. 5, regions for displaying display objects that are the same as or similar to those of the request source screen, which are included in the request destination screen, are denoted by reference numerals with the same last two digits thereas.

In region B01 of the request destination screen, the moving image represented by the moving image data transmitted from terminal apparatus 11A to terminal apparatus 11B is displayed substantially in real time.

In the text box in region B02 of the request destination screen, an English sentence indicated by text data received from translation server apparatus 14 as a response obtained by terminal apparatus 11B transmitting a request including message data received from terminal apparatus 11A to translation server apparatus 14 is displayed.

Similarly to when a sentence is displayed in the text box in region A02 of the request source screen, when a sentence is displayed in the text box in region B02 of the request destination screen, a voice uttering the sentence is generated from sound generation apparatus 1102 of terminal apparatus 11B. The request destination user can make the sound generation apparatus 1102 repeatedly generate the voice by performing a touch operation on the "Playback" button in region B02.

A plurality of virtual operation buttons are displayed in region B05 of the request destination screen. These operation buttons are operation buttons for the request destination user to convey fixed messages to the request source user, and a different message is associated with each operation button. The operation buttons displayed in region B05 can be customized by the request destination user in the same manner as the operation buttons (excluding the "Send" button) displayed in region A05 of the request source screen.

When the request destination user performs a touch operation on any of the operation buttons displayed in region B05, terminal apparatus 11B transmits message data indicating a message associated with the operation button on which the touch operation was performed to terminal apparatus 11A.

In region B06 of the request destination screen, a text box or the like for inputting a custom message that the request destination user wants to send to the request source user is displayed. The role of the display objects included in region B06 of the request destination screen is the same as the role of the display objects included in region A06 of the request source screen except that the image cannot be dragged and dropped onto the text box in region B06, and therefore description thereof will be omitted.

In region B08 of the request destination screen, a map showing the current position of the request source user (terminal apparatus 11A) is displayed. For this reason, terminal apparatus 11B receives position data indicating the current position of terminal apparatus 11A, which is transmitted from terminal apparatus 11A at predetermined time intervals. Terminal apparatus 11B transmits a request including the position data received from terminal apparatus 11A to route search server apparatus 13, and displays a map in region B08 using map data transmitted from route search server apparatus 13 as a response. Since the method by which terminal apparatus 11B generates the image of the map displayed in region B08 is the same as the method by which terminal apparatus 11A generates the image of the map displayed in region A08, description thereof will be omitted.

In region B09 of the request destination screen, a radio button for the request destination user to select whether to "ambiguously" or "distinctly" convey the current position of the request destination user to the request source user is displayed. Since the role of the radio button included in region B09 of the request destination screen is the same as the role of the radio button included in region A09 of the request source screen, description thereof will be omitted.

In region B10 of the request destination screen, a list box for conveying the current state of the request destination user to the request source user is displayed. Since the role of the list box included in region B10 of the request destination screen is the same as the role of the list box included in region A10 of the request source screen, description thereof will be omitted.

In region B11 of the request destination screen, an icon indicating the current state of the request source user is displayed. Since the role of the icon included in region B11 of the request destination screen is the same as the role of the icon included in region A11 of the request source screen, description thereof will be omitted.

In region B12 of the request destination screen, the image identified by the image identification data transmitted from terminal apparatus 11A to terminal apparatus 11B is displayed. That is, the image displayed in region B12 is an image (still image) selected from the moving image by the request source user. If the region data is associated with the image identification data received by terminal apparatus 11B from terminal apparatus 11A, terminal apparatus 11B displays, in region B12, an image obtained by adding a display object (the broken-line circle in FIG. 5) indicating the region indicated by the region data to the image identified by the image identification data.

In the text box in region B13 of the request destination screen, if the message data is associated with the image identification data received by terminal apparatus 11B from terminal apparatus 11A, an English sentence indicated by the text data received from translation server apparatus 14 as a response to terminal apparatus 11B transmitting a request including the message data to translation server apparatus 14 is displayed. When a message is displayed in the text box in region B13, terminal apparatus 11B generates audio of the message. The request destination user can repeatedly listen to the audio by performing a touch operation on the "Playback" button in region B13.

In region B14 of the request destination screen, a map showing the movement route from the current position of the request destination user (terminal apparatus 11B) to the image capture position of the image displayed in region B12 and the image capture direction of the image is displayed. Terminal apparatus 11B uses the position data last acquired by position acquisition means 119 as the position data of the departure location, transmits a request including position data acquired by position acquisition means 119 at the image capture time of the image displayed in region B12 as the position data of the destination to route search server apparatus 13, and receives map data and movement route data transmitted from route search server apparatus 13 as a response. Terminal apparatus 11B generates an image obtained by adding a broken line indicating the movement route indicated by the movement route data received from route search server apparatus 13, a circle mark indicating the current position of the request destination user, an arrow indicating the movement direction of the request destination user, and a fan mark indicating the image capture direction of the image displayed in region B12 to the map represented by the map data received from route search server apparatus 13, and displays the generated image in region B12.

If the request destination user receives a request to buy an object appearing in the image displayed in region B12 (e.g., the object appearing in the region indicated by the broken-line circle in region B12) from the request source user, for example, the request destination user can easily reach the location where the object instructed by the request source user is located by moving according to the movement route displayed in region B14. Also, the request destination user can easily specify the object instructed by the request source user while viewing the image displayed in region B12 at the reached location.

According to system 1 according to the above-described embodiment, the request source user can easily convey a target object that the request source user wants the request destination user to perform some action on to the request destination user by presenting an image in the moving image sent from the request destination user to the request destination user.

Also, according to system 1, the request source user can quickly and clearly convey a message to the request destination user by operating the operation buttons.

Also, according to system 1, even if the request source user and the request destination user use different languages, the request source user and the request destination user can communicate with each other.

Also, according to system 1, the request source user can easily confirm the current position and the current movement direction of the request destination user, and therefore the request source user can easily instruct the direction in which he or she wants the request destination user to move next to the request destination user.

Also, according to system 1, the request source user can easily send an image and a message in association with each other to the request destination user by performing a simple operation such as dragging and dropping an image selected from a moving image onto an operation button associated with a message or a text box in which a message has been input. Also, when the request source user drags and drops the image onto the operation button or the like, the request source user can easily convey the target object to the request destination user by touching the target object appearing in the image.

Modified Examples

System 1 described above may be modified in various ways within the scope of the technical idea of the present invention. Examples of modification are shown below. Two or more of the following modified examples may be combined as appropriate.

(1) Instead of the image identification data of the image selected from the moving image by the request source user, image data representing the image may be transmitted from terminal apparatus 11A to terminal apparatus 11B. In this case, terminal apparatus 11B displays the image represented by the image data received from terminal apparatus 11A in region B12 of the request destination screen.

(2) In the above-described embodiment, terminal apparatus 11A stores at least a portion of the moving image data received from terminal apparatus 11B, which corresponds to the most recent past predetermined time. The portion of the moving image data received by terminal apparatus 11A from terminal apparatus 11B that needs to be stored may be a portion corresponding to a predetermined amount, and does not necessarily need to be a portion corresponding to a predetermined time. For example, terminal apparatus 11A may store at least a portion of the moving image data received from terminal apparatus 11B, which corresponds to the most recent past predetermined data amount.

(3) Terminal apparatus 11A may display, on the image in region A03, the result of recognizing an object appearing in an image that is selected by the request source user and displayed in region A03 of the request source screen. In this case, terminal apparatus 11A is provided with an image recognition means for recognizing an object appearing in the image displayed in region A03 using a known image recognition technique, and displays an image obtained by adding a display object indicating the result of recognition performed by the image recognition means in region A03. Also, processing for image recognition may be performed by, for example, a server apparatus or the like that provides an image recognition service connected to system 1.

(4) Instead of transmitting and receiving message data indicating a message between terminal apparatus 11A and terminal apparatus 11B, message identification data for identifying a message may be transmitted and received. In this case, terminal apparatus 11A and terminal apparatus 11B store message data indicating fixed messages in advance in association with message identification data used in common between terminal apparatus 11A and terminal apparatus 11B. For example, terminal apparatus 11A transmits the message identification data of the message designated by the request source user to terminal apparatus 11B, and terminal apparatus 11B displays the message indicated by the message data identified by the message identification data received from terminal apparatus 11A. Similarly, terminal apparatus 11B transmits message identification data of a message designated by the request destination user to terminal apparatus 11A, and terminal apparatus 11A displays the message indicated by the message data identified by the message identification data received from terminal apparatus 11B.

(5) In the above-described embodiment, terminal apparatus 11A and terminal apparatus 11B receive message data indicating a sentence from the partner apparatus, and acquire voice data representing a voice uttering the sentence indicated by the message data from voice synthesis server apparatus 15. Instead of or in addition to this, voice data representing the sound of uttering the sentence of the message may be transmitted and received as message data between terminal apparatus 11A and terminal apparatus 11B.

(6) In the above-described embodiment, when the request destination user is an apparatus such as a robot provided with an operation means for performing a physical operation, operation instruction data for instructing a physical operation to the request destination user who is an apparatus may be transmitted as message data from terminal apparatus 11A to terminal apparatus 11B. In this case, the request destination user who is an apparatus operates according to the operation instruction indicated by the message data. Also, if the request destination user is an apparatus such as a robot provided with a movement means for moving, the request destination user who is an apparatus may move according to the movement route indicated by the movement route data.

(7) In the above-described embodiment, at least some of the requests made by terminal apparatus 11A to route search server apparatus 13, translation server apparatus 14, and voice synthesis server apparatus 15 may be made by terminal apparatus 11B. In this case, the data acquired by terminal apparatus 11B from those server apparatuses may be transmitted to terminal apparatus 11A. Similarly, in the above-described embodiment, at least some of the requests made by terminal apparatus 11B to route search server apparatus 13, translation server apparatus 14, and voice synthesis server apparatus 15 may be made by terminal apparatus 11A. In this case, the data acquired by terminal apparatus 11A from those server apparatuses may be transmitted to terminal apparatus 11B.

(8) In the above-described embodiment, at least some of the processing performed by route search server apparatus 13, translation server apparatus 14, voice synthesis server apparatus 15, and voice recognition server apparatus 16 may be performed by terminal apparatus 11A or terminal apparatus 11B.

(9) In the above-described embodiment, the operation buttons that are displayed in region A07 of the request source screen (FIG. 4) are examples, and operation buttons for instructing other operations may also be displayed in region A07. For example, an operation button associated with a message such as "Please jump" and an operation button associated with a message such as "Please move forward quickly" or "Please move forward slowly" may be displayed in region A07.

(10) In the description of the above-described embodiment, the request source user and the request destination user are assumed to be one person each, but at least one of the request source user and the request destination user may be a plurality of people. In this case, since the number of terminal apparatuses that simultaneously perform data communication in order to perform the local proxy service is three or more, management server apparatus 12 may relay the data communication between those terminal apparatuses.

Also, if there are a plurality of request source users, it is inconvenient if contradicting instructions are given to the request destination user at the same time from the plurality of request source users. In order to avoid such an inconvenience, only one of the plurality of terminal apparatuses 11A may have instruction authority, and the transmission of image identification data and message data from terminal apparatus 11A having no instruction authority to terminal apparatus 11B may be restricted.

(11) In the above-described embodiment, the icon selected in region A10 of the request source screen (FIG. 4) is selected by the request source user. Instead of this, for example, terminal apparatus 11A may estimate the state of the request source user based on an image of the face of the request source user captured by terminal apparatus 11A, the voice of the request source user picked up by terminal apparatus 11A, and the like, and terminal apparatus 11A may automatically select the icon in region A10 according to the estimation result. Similarly, terminal apparatus 11B may estimate the state of the request destination user based on an image of the face of the request destination user captured by terminal apparatus 11B, the voice of the request destination user picked up by terminal apparatus 11B, and the like, and terminal apparatus 11B may automatically select the icon in region B10 of the request destination screen (FIG. 5) according to the estimation result.

Note that the type of user's state displayed in region A10 or region B10 is not limited to mood and physical strength.

(12) Using system 1, the request source user may request the request destination user to make an electronic payment using an image code such as a QR code (registered trademark) or a barcode at the local site. For example, terminal apparatus 11A can transmit an image code for electronic payment of the request source user to terminal apparatus 11B, and a store can receive payment of a fee from the request source user due to a staff member or the like of the store at the local site reading the image code displayed on terminal apparatus 11B with a code reader.

Also, terminal apparatus 11B can transmit an image obtained by capturing an image of the image code for electronic payment of the store at the local site to terminal apparatus 11A, and the store can receive payment of money from the request source user due to the request source user performing an operation of paying the designated balance to the store identified by the image code displayed on terminal apparatus 11A. In this case, the store confirms that the processing of payment of the designated fee by the request source user is complete using an image transmitted from terminal apparatus 11A to terminal apparatus 11B. Accordingly, in order to prevent the image transmitted from terminal apparatus 11A to terminal apparatus 11B from being forged, for example, terminal apparatus 11B determines whether or not the time displayed on the payment screen substantially matches the current time, and if they do not substantially match, a warning may be displayed.

(13) In the above-described embodiment, if the request source user wants to present any image in the moving image to the request destination user, it is necessary to temporarily display the image in region A03 of the request source screen. The method for designating the image that the request source user wants to present to the request destination user is not limited to this. For example, by performing a predetermined operation such as a double tap on region A01, the image identification data of the image may be transmitted from terminal apparatus 11A to terminal apparatus 11B without temporarily displaying the image in region A03. Also, when the transmission source user performs an operation such as dragging and dropping from region A01 to the "Send" button or the like in region A05, the image identification data of the image displayed in the moving image may be transmitted from terminal apparatus 11A to terminal apparatus 11B.

(14) In the above-described embodiment, the request source user can accumulate candidate images in region A04 by performing an intentional operation such as dragging and dropping an image from region A03 of the request source screen to region A04. Instead of this, all of the images displayed in region A03 by the request source user may be accumulated in region A04. In this case, automatically-accumulated images and intentionally-accumulated images may be distinguished from each other by adding bookmarks to the images intentionally accumulated in region A04 by the request source user, or the like.

(15) If the request destination user is at a location where image capture for streaming is allowed but recording is prohibited, recording of moving images (including recording of images constituting the moving images) in terminal apparatus 11A and terminal apparatus 11B may be made impossible to execute. In this case, for example, management server apparatus 11 or the like need only store a database storing prohibited area data indicating areas where recording is prohibited, prohibition period data indicating a period during which recording is prohibited, and permission condition data indicating a condition of an authorized person who is exceptionally permitted to record (e.g., a host of an event where recording is prohibited), and terminal apparatus 11A and terminal apparatus 11B need only determine whether or not recording of moving images is prohibited by referring to the database. Then, if the request source user or the request destination user is an authorized person who is exceptionally permitted to record, confirmation that he or she is the authorized person (e.g., inputting a password known only to the authorized person, etc.) is performed, and if it is confirmed that he or she is an authorized person, terminal apparatus 11A and terminal apparatus 11B may be able to record a moving image. Note that, for example, a method of adding a code for prohibiting recording to the moving image data generated in terminal apparatus 11B and thereafter transmitting the data to terminal apparatus 11A is conceivable as a method for prohibiting recording of a moving image.

(16) In the above-described embodiment, the request destination user can confirm the movement route from the current position to the image capture position of the image presented by the request source user on the map. Instead of or in addition to this, terminal apparatus 11B may display the movement route to the request destination user using AR (Augmented Reality) technology. In this case, when the request destination user captures an image of the surrounding area using camera 107 of terminal apparatus 11B, display objects such as arrows indicating the movement route are displayed in a superimposed manner together with the image captured by camera 107 on touch screen 104 of terminal apparatus 11B. As a result, the request destination user can reach the destination more intuitively.

The invention claimed is:

1. A terminal apparatus comprising:
a moving image acquisition means for acquiring moving image data representing a moving image captured by an image capture apparatus;
a transmission means for transmitting the moving image data acquired by the moving image acquisition means to a communication partner apparatus in real time;
a storage means for storing at least a portion of the moving image data acquired by the moving image acquisition means, the portion corresponding to a most recent past predetermined amount;
a reception means for receiving image identification data for identifying an image transmitted from the communication partner apparatus; and
a display instruction means for displaying, on a display apparatus, the image identified by the image identification data received by the reception means among a plurality of images constituting the moving image represented by the moving image data stored in the storage means.

2. The terminal apparatus according to claim 1, wherein, if the reception means has received message identification data for identifying a message transmitted in association with the image identification data or message data indicating the message from the communication partner apparatus, the display instruction means displays, on the display apparatus, the message identified by the message identification data or the message indicated by the message data, together with the image identified by the image identification data.

3. The terminal apparatus according to claim 2, further comprising:
a translation means for, if text data indicating a sentence in a language that is not a language used by a user of the terminal apparatus, acquiring text data indicating a sentence obtained by translating the sentence indicated by the text data into the language used by the user,
wherein, if the message indicated by the message data indicates a sentence in a language that is not the language used by the user of the terminal apparatus, the display instruction means displays, on the display apparatus, a sentence obtained by translating the sentence indicated by the text data acquired by the translation means.

4. The terminal apparatus according to claim 1, further comprising:
an interpretation means for, if text data indicating a sentence in a language that is not a language used by a user of the terminal apparatus has been acquired, acquiring voice data representing a sound of uttering a sentence obtained by translating the sentence indicated by the text data into the language used by the user; and
a sound generation instruction means for, if the message indicated by the message data indicates a sentence in a language that is not the language used by the user of the terminal apparatus, causing a sound generation apparatus to generate the sound of uttering the sentence obtained by translating the sentence represented by the voice data acquired by the interpretation means.

5. The terminal apparatus according to claim 1, further comprising:
a position acquisition means for acquiring position data indicating a position of the terminal apparatus; and
a map acquisition means for acquiring map data representing a map of an area including the position of the terminal apparatus,
wherein the display instruction means displays, on the display apparatus, an image obtained by adding, to a map represented by the map data, a display object indicating the position indicated by the position data corresponding to an image capture timing of the image identified by the image identification data received by the reception means.

6. The terminal apparatus according to claim 5, wherein the moving image acquisition means acquires, together with moving image data, image capture direction data indicating respective image capture directions of a plurality of images constituting the moving image represented by the moving image data, and the display instruction means displays, on the display apparatus, an image obtained by adding, to the map represented by the map data, a display object indicating the image capture direction indicated by the image capture direction data corresponding to the image capture timing of the image identified by the image identification data received by the reception means.

7. The terminal apparatus according to claim 1, further comprising:

a position acquisition means for acquiring position data indicating a position of the terminal apparatus; and a movement route acquisition means for acquiring movement route data indicating a movement route from the position of the terminal apparatus indicated by the position data acquired most recently by the position acquisition means, to a position indicated by the position data corresponding to an image capture timing of the image identified by the image identification data received by the reception means, wherein the display instruction means displays, on the display apparatus, a display object indicating the movement route indicated by the movement route data.

8. The terminal apparatus according to claim 1, further comprising:

an operation means for, if the reception means has received message identification data for identifying an operation instruction instructing a physical operation, the operation instruction being transmitted in association with the image identification data, or message data indicating the operation instruction from the communication partner apparatus, performing a physical operation according to the operation instruction identified by the message identification data or the operation instruction indicated by the message data.

9. The terminal apparatus according to claim 1, further comprising:

a position acquisition means for acquiring position data indicating a position of the terminal apparatus;

a movement route acquisition means for acquiring movement route data indicating a movement route from the position of the terminal apparatus indicated by the position data acquired most recently by the position acquisition means, to a position indicated by the position data corresponding to an image capture timing of the image identified by the image identification data received by the reception means; and a movement means for moving according to the movement route indicated by the movement route data.

* * * * *